(12) United States Patent
Sasaki et al.

(10) Patent No.: US 10,275,916 B2
(45) Date of Patent: Apr. 30, 2019

(54) DISPLAY METHOD OF ROAD PROPERTY AND DISPLAY DEVICE OF ROAD PROPERTY

(71) Applicant: TOPCON CORPORATION, Tokyo (JP)

(72) Inventors: You Sasaki, Tokyo (JP); Tadayuki Ito, Tokyo (JP)

(73) Assignee: TOPCON CORPORATION, Itabashi-Ku, Tokyo (JP)

( * ) Notice: Subject to any disclaimer, the term of this patent is extended or adjusted under 35 U.S.C. 154(b) by 0 days.

(21) Appl. No.: 15/423,817

(22) Filed: Feb. 3, 2017

(65) Prior Publication Data
US 2017/0309050 A1    Oct. 26, 2017

(30) Foreign Application Priority Data

Feb. 4, 2016   (JP) ................................. 2016-020250

(51) Int. Cl.
*G06T 11/60*   (2006.01)
*G06T 11/00*   (2006.01)
(Continued)

(52) U.S. Cl.
CPC .......... *G06T 11/60* (2013.01); *G06K 9/00791* (2013.01); *G06K 9/00798* (2013.01);
(Continued)

(58) Field of Classification Search
CPC combination set(s) only.
See application file for complete search history.

(56) References Cited

U.S. PATENT DOCUMENTS 5,130,709 A    7/1992  Toyama et al.
6,233,510 B1   5/2001  Platner et al.
(Continued)

FOREIGN PATENT DOCUMENTS

JP    H10-288516 A        10/1998
JP    2010175756 A   *    8/2010
(Continued)

*Primary Examiner* — Wesner Sajous
(74) *Attorney, Agent, or Firm* — Chiesa Shahinian & Giantomasi PC

(57) ABSTRACT

To efficiently and effectively display a plurality of pieces of information that can be acquired from measurement data. Measurement data on a spaced amount from a measurement reference plane at each point of a road measured for a predetermined road width along a measurement path of a road to be measured and road image data including the road acquired along the measurement path are acquired; a unit area to become a unit of processing is set based on the measurement data; a model plane in the unit area is set from the measurement data in the unit area; point group data indicating a spaced amount from the model plane at each point of the unit area is generated; spaced amount display data displaying shading or hue corresponding to a spaced amount specified with the point group data in a contour of the road is generated; and a road image based on road image data corresponding to a specified area of the road and a spaced amount image based on the spaced amount display data corresponding to the road image are simultaneously displayed.

20 Claims, 12 Drawing Sheets

(51) Int. Cl.
*G06K 9/00* (2006.01)
*G06K 9/46* (2006.01)
*G06K 9/62* (2006.01)

(52) U.S. Cl.
CPC ......... *G06K 9/4642* (2013.01); *G06K 9/6212* (2013.01); *G06T 11/001* (2013.01)

(56) References Cited

U.S. PATENT DOCUMENTS

| | | |
|---|---|---|
| 2003/0069668 A1 * | 4/2003 | Zurn .................. E01C 19/006 700/245 |
| 2009/0295917 A1 | 12/2009 | Zhang et al. |
| 2009/0310143 A1 | 12/2009 | Gardiner et al. |
| 2010/0088024 A1 | 4/2010 | Takahara et al. |
| 2010/0182613 A1 | 7/2010 | Holton et al. |
| 2013/0103259 A1 | 4/2013 | Eng et al. |
| 2013/0266186 A1 | 10/2013 | Zhang et al. |
| 2014/0081573 A1 | 3/2014 | Urmson et al. |
| 2014/0104424 A1 | 4/2014 | Zhang et al. |
| 2014/0184800 A1 | 7/2014 | Hirai et al. |
| 2014/0355839 A1 | 12/2014 | Bridgers et al. |
| 2015/0169966 A1 | 6/2015 | Ishimaru et al. |
| 2015/0371095 A1 | 12/2015 | Hartmann et al. |
| 2016/0171278 A1 | 6/2016 | Ponder et al. |

FOREIGN PATENT DOCUMENTS

| | | | |
|---|---|---|---|
| JP | 2013205130 A | * | 10/2013 |
| JP | 2014163707 A | * | 9/2014 |
| JP | 2015-031018 A | | 2/2015 |

\* cited by examiner

FIG. 8A
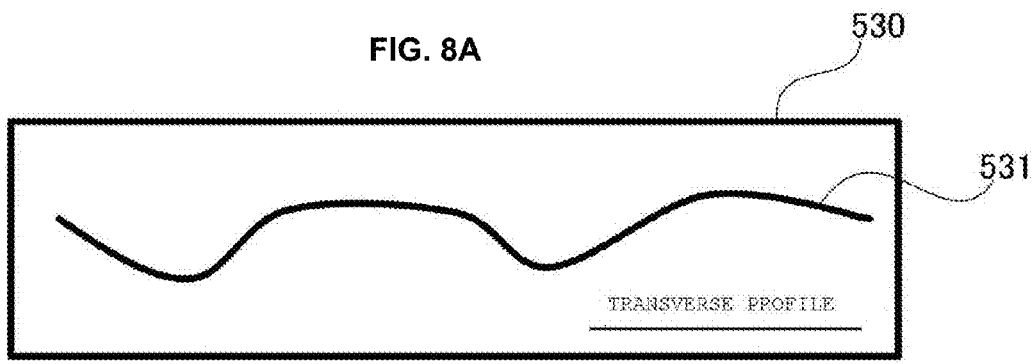
FIG. 8B
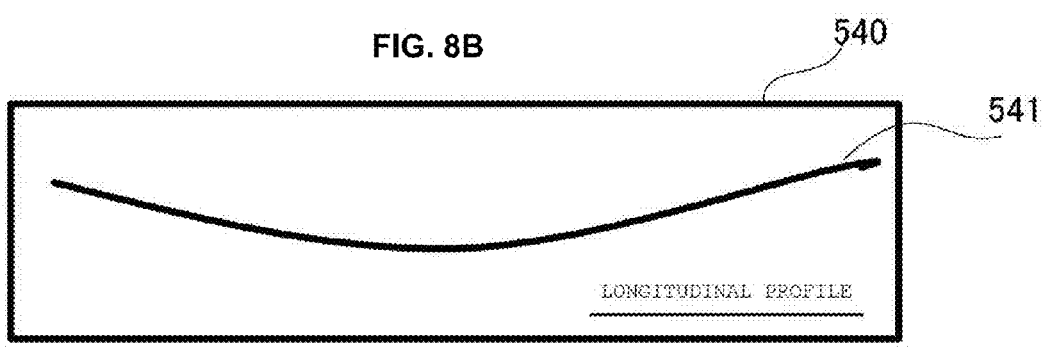
FIG. 8C
```
COORDINATE        : xxx.xxx,yyy.yyy,zzz.zzz
SEPARATION
AMOUNT            : - 23mm
ACQUIRED TIME     : 2015_12_15_12_03_53
TRANSVERSE PROFILE WIDTH  : 38mm
LONGITUDINAL PROFILE WIDTH : 67mm
```

FIG. 10A
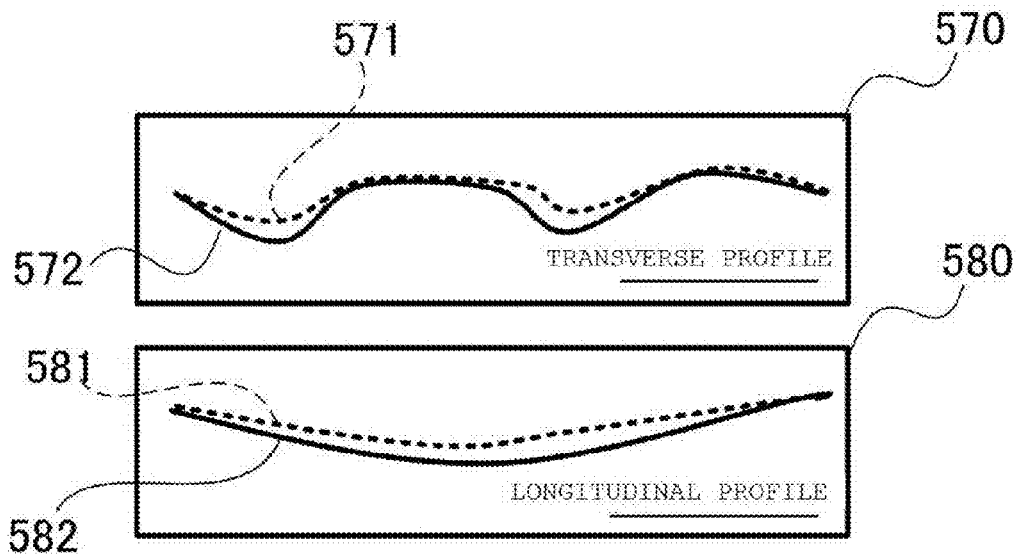
FIG. 10B
```
COORDINATE:      xxx.xxx,yyy.yyy,zzz.zzz
SEPARATION
  AMOUNT  :  ~ 20mm
ACQUIRED TIME :    2013_08_10_16_05_15
 TRANSVERSE PROFILE WIDTH :   30mm
LONGITUDINAL PROFILE WIDTH :  55mm
```
FIG. 10C
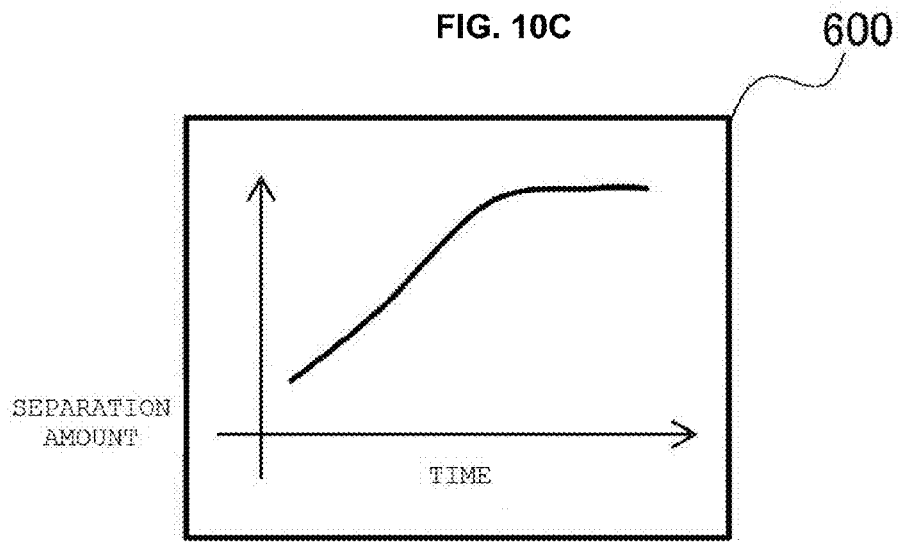

FIG. 11A     FIG. 11B
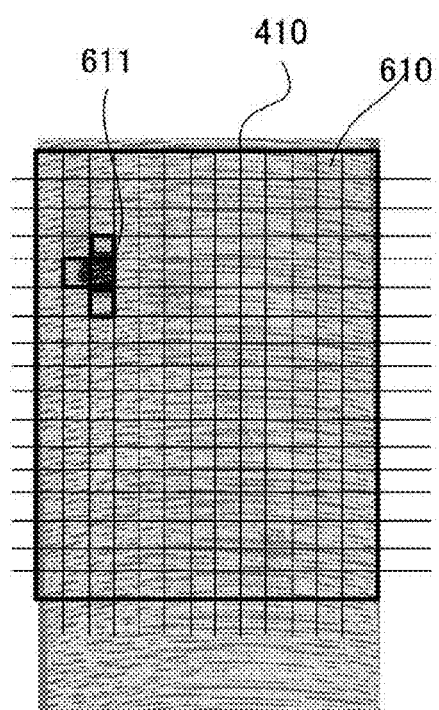
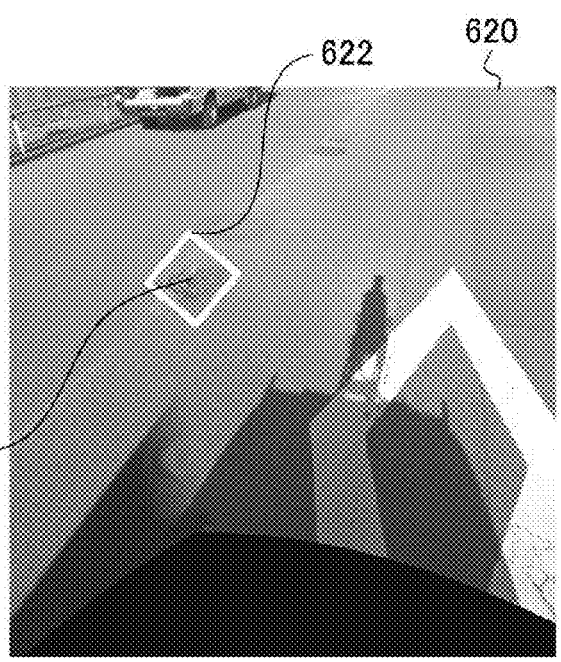

DISPLAY METHOD OF ROAD PROPERTY AND DISPLAY DEVICE OF ROAD PROPERTY

CROSS-REFERENCE TO RELATED APPLICATIONS

This application claims priority to Japanese Patent Application No. 2016-020250 filed on Feb. 4, 2016, which is incorporated herein by reference in its entirety.

TECHNICAL FIELD

The present invention relates to a display method of a road property, and a display device of the road property.

BACKGROUND OF THE INVENTION

Generally, roads produce splits and unevenness over time due to the passing of vehicles, and the like, and such splits and unevenness need to be repaired. In order to repair such roads, the road is inspected, and data on road surface property of the road, that is, data on a state of unevenness of the road surface are acquired. The data on the road surface property are acquired by measurement carried out by measuring personnel, or by causing a road surface property vehicle to travel along a predetermined path of a road to be measured. A device for irradiating a road surface with a scan light, and measuring a height of each point of the road surface is mounted on the road surface property vehicle.

Patent document 1 (i.e., Japanese Unexamined Patent Publication No. 10-288516) describes a device that projects light toward a plane while moving a moving body in a longitudinal direction of the plane, and measures a step difference of the plane according to the light projection result, the device having a configuration of including a means for detecting a moving distance, a light projecting means, a means for imaging a light irradiation line, a transverse direction data computing means for acquiring height data, a vertical direction data computing means, and a three-dimensional data computing means. According to such configuration, a technique in which the light is projected toward a plane RD from a moving body so that one irradiation line forms on the plane RD along a transverse direction W of the plane RD every time the moving body moves a predetermined distance, and an unevenness profile is acquired in real time by the various types of means is described.

Japanese Unexamined Patent Publication No. 10-288516 (i.e., Patent document 1)

The data on the road surface property acquired in the above manner is easy to understand and easy to evaluate when image displayed. In addition to the height at each point, information on a planar property and a three-dimensional property of the road surface at each point can be acquired from the data on the road surface property. It is thus desired to display the above described information in association in an easily understandable and evaluable manner from the measured data.

In light of the foregoing, it is an object of the present invention to provide a display method of a road property and a display device of the road property capable of efficiently and effectively displaying a plurality of pieces of information that can be acquired from measurement data.

SUMMARY OF THE INVENTION

An invention described in claim 1 for solving the problem described above relates to a display method of a road property including the steps of acquiring measurement data on a spaced amount from a measurement reference plane at each point of a road surface measured for a predetermined road width along a measurement path of a road to be measured; setting a unit area to become a unit of processing based on the measurement data; setting a model plane in the unit area from the measurement data in the unit area; generating point group data indicating a spaced amount from the model plane at each point of the unit area; generating spaced amount display data displaying shading or hue corresponding to a spaced amount specified with the point group data in a contour of the road; and displaying a spaced amount image based on the spaced amount display data corresponding to a specified area of the road.

Similarly, according to the invention of claim 2, the display method further includes steps of acquiring road image data including the road acquired along the measurement path; and displaying a road image based on the road image data corresponding to the specified area of the road with the spaced amount image or with the spaced amount image superimposed.

According to the invention of claim 3, the display method further includes a step of acquiring map data including the road to be measured; and displaying a map image based on the map data with at least one of the spaced amount image or the road image.

According to the invention of claim 4, a road image pointer that points to one point on the road image and a spaced amount image pointer that points to one point on the spaced amount image are displayed, at least one of the road image pointer or the spaced amount image pointer being position variable; and the road image pointer and the spaced amount image pointer point to a same area of the road.

According to the invention of claim 5, the display method further includes a step of displaying at least one of a longitudinal profile or a transverse profile of the road in an area specified in the road image or the spaced amount image.

According to the invention of claim 6, a value of at least one of a position coordinate at one point on the road specified with the road image pointer or the spaced amount image pointer, a spaced amount from the model plane, and an acquisition timing of the measurement data is displayed in characters.

According to the invention of claim 7, the display method further includes the steps of acquiring the point group data of a same position acquired at different timing; and executing at least one of displaying a plurality of longitudinal profiles at specified different timing in a same specified area in a superimposed manner, and displaying a plurality of transverse profiles at specified different timing in a same specified area in a superimposed manner.

According to the invention of claim 8, the display method further includes the steps of acquiring the point group data of the same position acquired at different timing; and displaying a temporal change in the spaced amount from the model plane at the same specified area in a graph.

According to the invention of claim 9, the display method further includes the steps of generating a contour of a puddle formed in a recess of a road surface by an amount of precipitation specified based on the point group data; and displaying the contour on the road image in a superimposed manner.

According to the invention of claim 10, the display method further includes the steps of dividing the unit area into a plurality of sections and calculating a statistic of the point group data in each section; extracting a section having a statistic satisfying a predefined reference value; detecting a deformed area candidate based on a changing amount of the statistic of the extracted section and a statistic of a section adjacent to the extracted section; and displaying a deformed area detection mark at a detection position of the detected deformed area candidate in the road image.

An invention of claim 11 relates to a display device of a road property including a means for storing measurement data on a spaced amount from a measurement reference plane at each point of a road measured for a predetermined road width along a measurement path of a road to be measured; a means for setting a unit area to become a unit of processing based on the measurement data; a means for setting a model plane in the unit area from the measurement data in the unit area; a means for generating point group data indicating a spaced amount from the model plane at each point of the unit area; a means for generating spaced amount display data displaying shading or hue corresponding to a spaced amount specified with the point group data in a contour of the road; and a means for displaying a spaced amount image based on the spaced amount display data corresponding to a specified area of the road.

According to the invention of claim 12, the display device further includes a means for acquiring road image data including the road acquired along the measurement path; and a means for displaying a road image based on the road image data corresponding to the specified area of the road with the spaced amount image or with the spaced amount image superimposed.

According to the invention of claim 13, the display device further includes a means for acquiring map data including the road to be measured; and a means for displaying a map image based on the map data with at least one of the spaced amount image or the road image.

According to the invention of claim 14, a road image pointer that points to one point on the road image and a spaced amount image pointer that points to one point on the spaced amount image are displayed, at least one of the road image pointer or the spaced amount image pointer being position variable; and the road image pointer and the spaced amount image pointer cooperatively operate to point to a same area in the road.

According to the invention of claim 15, the display device further includes a means for displaying at least one of a longitudinal profile or a transverse profile of the road in an area specified in the road image or the spaced amount image.

According to the invention of 16, the display device further includes a means for displaying a value of at least one of a position coordinate at one point on the road specified with the road image pointer or the spaced amount image pointer, a spaced amount from the model plane, and an acquisition timing of the measurement data in characters.

According to the invention of claim 17, the means for storing the point group data includes at least one of a means for storing the point group data of a same position acquired at different timing; or a means for displaying a plurality of longitudinal profiles at specified different timing in a same specified area in a superimposed manner and a means for displaying a plurality of transverse profiles at specified different timing in a same specified area in a superimposed manner.

According to the invention of claim 18, the means for storing the point group data stores the point group data of the same position acquired at different timing; and the device further includes a means for displaying a temporal change in the spaced amount from the model plane at the same specified area in a graph.

According to the invention of claim 19, the display device further includes a means for generating a contour of a puddle formed in a recess of a road surface by an amount of precipitation specified based on the point group data; and a means for displaying the contour on the road image in a superimposed manner.

According to the invention of claim 20, the display device further includes a means for dividing the unit area into a plurality of sections and calculating a statistic of the point group data in each section; a means for extracting a section having a statistic satisfying a predefined reference value, and detecting a deformed area candidate based on a changing amount of the statistic of the extracted section and a statistic of a section adjacent to the extracted section; and a means for displaying a deformed area detection mark at a detection position of the detected deformed area candidate in the road image.

According to the display method of the road property and the display device of the road property of the present invention, a plurality of pieces of information that can be acquired from the measurement data can be efficiently and effectively displayed. This contributes to efficient maintenance task, and enables comprehensive determination by not only the cross-section but also by information obtained from the road image and the point group data, so that an area that requires repair can be specified and recorded.

In other words, according to the inventions described in claim 1 and claim 11, the spaced amount image in which the uneven state of the road surface is displayed in shading or hue within the contour of the road can be simultaneously displayed. The uneven state of the road surface thus can be determined.

According to the inventions described in claim 2 and claim 12, the road image based on the road image data can be displayed with the spaced amount image or with the spaced amount image superimposed thereon. Thus, the spaced amount image and the road image can be simultaneously recognized, and the road surface property can be comprehensively recognized.

According to the inventions described in claim 3 and claim 13, a map image based on the map data can be display with at least one of the spaced amount image or the road image, and thus the spaced amount image and the road image can be recognized while referencing the map image, and the road surface property can be comprehensively recognized.

According to the inventions described in claim 4 and claim 14, the road image pointer that points to one point on the road image and the spaced amount image pointer that points to one point on the spaced amount image can be displayed. Thus, determination can be made with the position of the road image and the position of the spaced amount image corresponded one to one.

According to the inventions described in claim 5 and claim 15, the longitudinal profile and the transverse profile of the road at the specified position can be displayed. Thus, the state of the road surface can be three-dimensionally determined and the shape of the split and the recess as well as the recessed amount can be easily determined, and furthermore, whether a split formed in the path direction or a recess not extended in the path direction can be easily determined.

According to the inventions described in claim 6 and claim 16, a value of at least one of the position coordinate at one point on the specified road, the spaced amount from the model plane, the acquisition timing of the measurement data, the width dimension of the transverse profile, and the width dimension of the longitudinal profile is displayed in characters. Thus, each amount can be quantitatively grasped.

According to the inventions described in claim 7 and claim 17, a plurality of longitudinal profiles at specified different timing in a same specified area can be displayed in a superimposed manner, and a plurality of transverse profiles at specified different timing in a same specified area can be displayed in a superimposed manner. Thus, the change in profile over time can be easily recognized.

According to the inventions described in claim 8 and claim 18, the temporal change in the spaced amount from the model plane at the same specified area can be displayed in a graph. Thus, the temporal change in the road property at the specified point can be visually recognized, and can be further predicted. Furthermore, an area where the changing rate of the road surface property is large becomes an index of heavy traffic, and the like.

According to the inventions described in claim 9 and claim 19, the contour of the puddle formed in the recess of the road surface by the amount of precipitation specified based on the point group data can be displayed in a superimposed manner on the road image. Thus, the spreading of the puddle, and the like at the time of rain can be predicted.

According to the inventions described in claim 10 and claim 20, a pot hole, a crack, and the like, which are partial hollowing or hole in the road, serving as the recess, a protrusion between splits serving as the projection, and the like can be detected as the deformed area of the road surface while being distinguished from the gradual recess and projection. Thus, recesses and projections that are difficult to visually detect can be reliably detected.

BRIEF DESCRIPTION OF DRAWINGS

FIG. 2A is a block diagram showing a configuration of a point group data generating means, and FIG. 2B is a block diagram showing a configuration of a deformed area detecting means;

FIG. 3A is a flowchart showing a processing procedure of the point group data generating means, and FIG. 3B is a flowchart showing a processing procedure of the deformed area detecting means;

FIG. 4A is a side view and FIG. 4B is a plan view;

FIG. 5A is a perspective view of the measurement data, and FIG. 5B is a schematic view showing the measurement data and a measurement reference plane;

FIG. 6A is a schematic view showing the unit area, and FIG. 6B is a schematic view showing the point group data and a model plane MP;

FIG. 7A is a perspective schematic view showing the model plane MP and the point group data, FIG. 7B is a schematic view showing a spaced amount image, and FIG. 7C is a schematic view showing a road image;

FIGS. 8A, 8B, and 8C show an image displayed on an image displaying means, where FIG. 8A is a schematic view showing a transverse profile, FIG. 8B is a schematic view showing a longitudinal profile, and FIG. 8C is a view showing data display in characters;

FIGS. 10A, 10B, and 10C show an image displayed on the image displaying means, where FIG. 10A is a view showing a horizontal profile and a vertical profile at different timing, FIG. 10B is a graph showing temporal change in hollowed amount, and FIG. 10C is a view showing data display in characters;

FIGS. 11A and 11B show a detection state and a display state of a recess, where FIG. 11A is a schematic view showing a section, and FIG. 11B is a view showing a map image displaying a deformed area detection mark.

DETAILED DESCRIPTION OF THE EXEMPLARY EMBODIMENTS

A display method of a road property and a display device of the road property according to a mode for carrying out the present invention will be described.

A display method of a road property and a display device of the road property according to the present embodiment display together a spaced amount image, which is shading coded or color coded in correspondence with a spaced amount of point group data representing a separation amount from a model plane, and a road image, which lies along a relevant measurement path. A position variable pointer is displayed on the spaced amount image and the road image, where when one point is specified with at least one pointer, an unevenness amount from the model plane at the relevant position coordinate, a coordinate value, an acquisition timing, and the like are displayed. A transverse profile, a longitudinal profile, a maximum and a minimum width of the profile of the road surface at an area corresponding to the pointer are also displayed. Furthermore, each image, measurement results in the past of the value, and a temporal change are displayed. Furthermore, changing rate of the road surface situation at a specified point, contour of a puddle formed in the recess of the road estimated from a recessed amount, a deformed area of the road surface, for example, a pot hole (partial hollowing or hole in the road) serving as the recess, and an abnormal area detection mark indicating a protrusion between splits serving as a projection are displayed on the road image. A desired display can be selected from such displays according to an instruction from an input means, and can be displayed in plurals. Accordingly, specification and recording of an area that needs to be repaired can be carried out.

Figure 1:
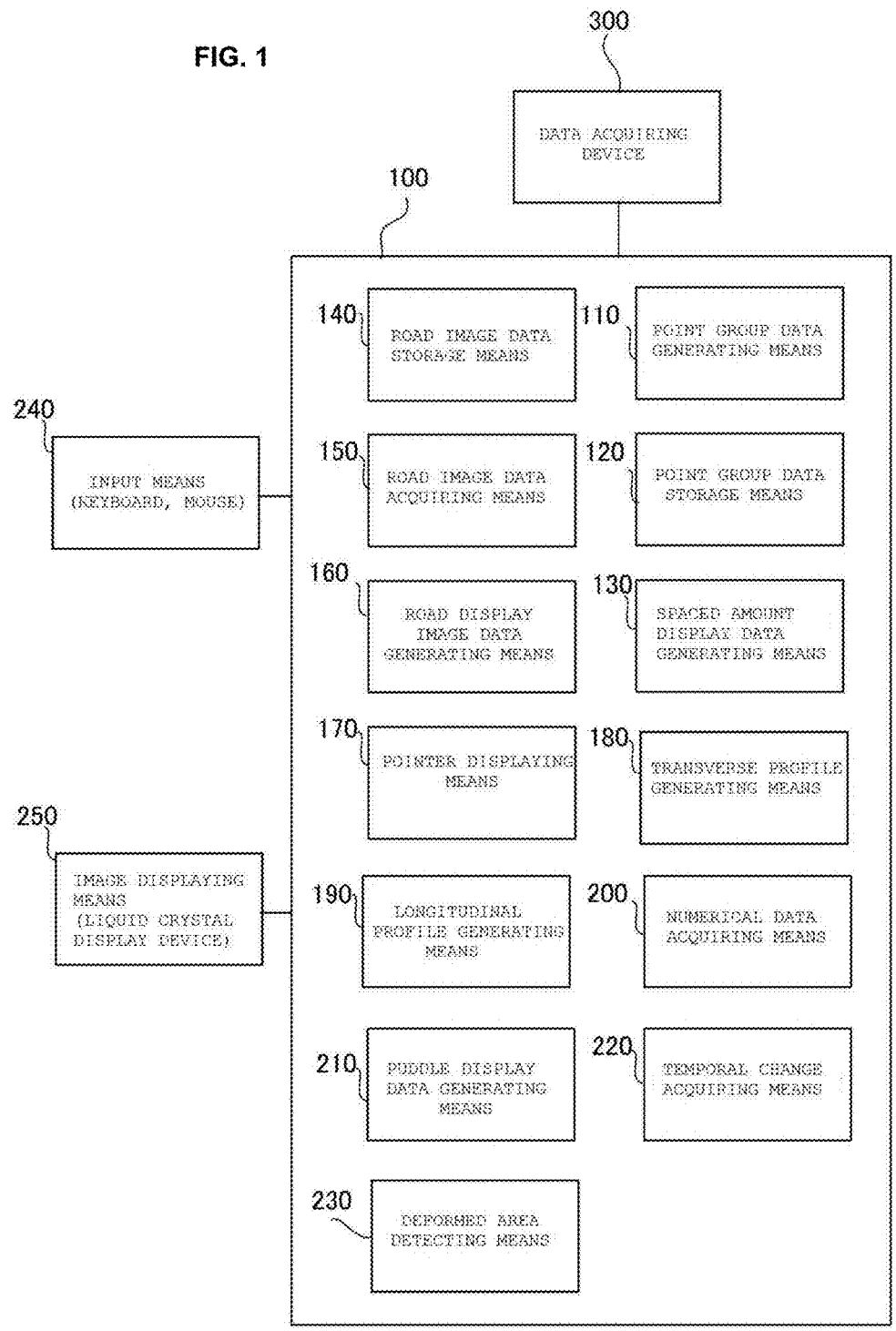
FIG. 1 is a block diagram showing a configuration of a display device of a road property according to an embodiment of the present invention.

A display device of the road property will be hereinafter described. FIG. 1 is a block diagram showing a configuration of a display device of a road property according to an embodiment of the present invention, and FIG. 2 is a block diagram showing a configuration of a point group data acquiring means.

A display device 100 of a road property (hereinafter simply referred to as "display device 100") according to an embodiment of the present invention is connected to a data acquiring device 300, and acquires measurement data related to a height of a road surface and a road image including the periphery from the data acquiring device 300. An input means 240 including a keyboard, a mouse, a touch panel, and the like, and an image displaying means 250 including a liquid crystal display device are connected to the display device 100. An area, a measurement date and time, a display method, and the like of a desired road are input from the input means 240 to the display device 100, and a spaced amount image showing an uneven state of the road surface, a road image showing an outer appearance of the road, and the like generated by the display device 100 are displayed on the image displaying means 250.

As shown in FIG. 1, the display device 100 includes a point group data generating means 110, a point group data storage means 120, a spaced amount display data generating means 130, a road image data storage means 140, a road image data acquiring means 150, a road display image generating means 160, and a pointer displaying means 170. The display device 100 includes a transverse profile generating means 180, a longitudinal profile generating means 190, a numerical data acquiring means 200, a puddle display data generating means 210, a temporal change acquiring means 220, and a deformed area detecting means 230.

The display device 100 is configured as a computer equipped with a CPU (Central Processing Unit) for a processing device, a RAM (Random Access Memory) for a main storage device, a ROM (Read Only Memory), an HDD (Hard Disc Drive) for an auxiliary storage device, and the like, and realizes the functions of the point group data generating means 110, the point group data storage means 120, the spaced amount display data generating means 130, the road image data storage means 140, the road image data acquiring means 150, the road display image generating means 160, the pointer displaying means 170, the transverse profile generating means 180, the longitudinal profile generating means 190, the numerical data acquiring means 200, the puddle display data generating means 210, the temporal change acquiring means 220, and the deformed area detecting means 230 by executing a program with the CPU.

Figure 4A:
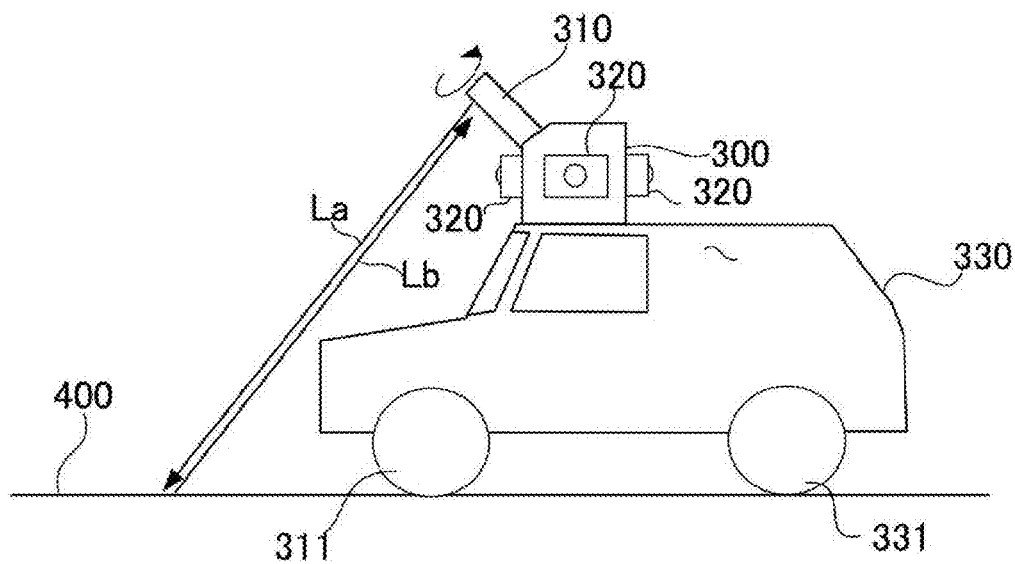
FIGS. 4A and 4B are a schematic view showing a measurement state of a road surface, where
Figure 4B:
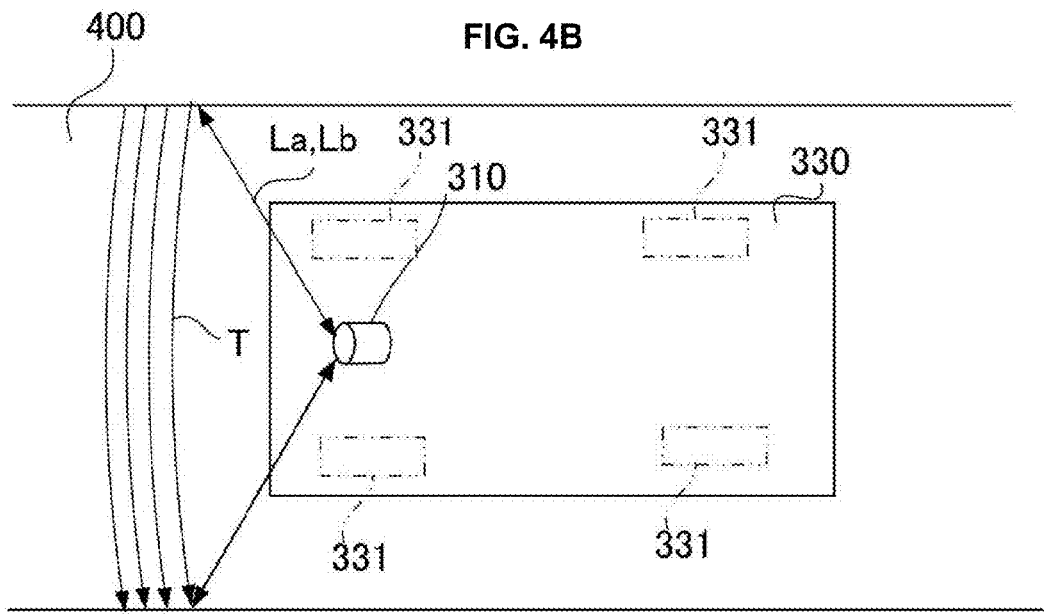

First, the data acquiring device 300 will be described. FIGS. 4A-B are a schematic view showing a measurement state of the road surface, where FIG. 4A is a side view and FIG. 4B is a plan view. As shown in FIG. 4A, the data acquiring device 300 is mounted on a vehicle 330 travelling on a road 400. The data acquiring device 300 includes a scanner 310, a whole circumference camera 320, an GNSS device (Global Navigation Satellite System) device, an orientation detecting device of the data acquiring device 300, an acceleration meter, and the like. The data acquiring device 300 irradiates a scan light La in a spiral form toward a diagonally front side of the vehicle 330 with the scanner 310 while acquiring the position with the GNSS device, and receives a reflected light Lb from the road 400. The measurement data of the road 400 is acquired based on a time until the reception. Thus, a trajectory T of the scan light La at the road 400 becomes an arcuate shape, as shown in FIG. 4B. At the same time, the data acquiring device 300 acquires an image of a road over the entire circumference with the whole circumference camera 320.

Figure 5A:
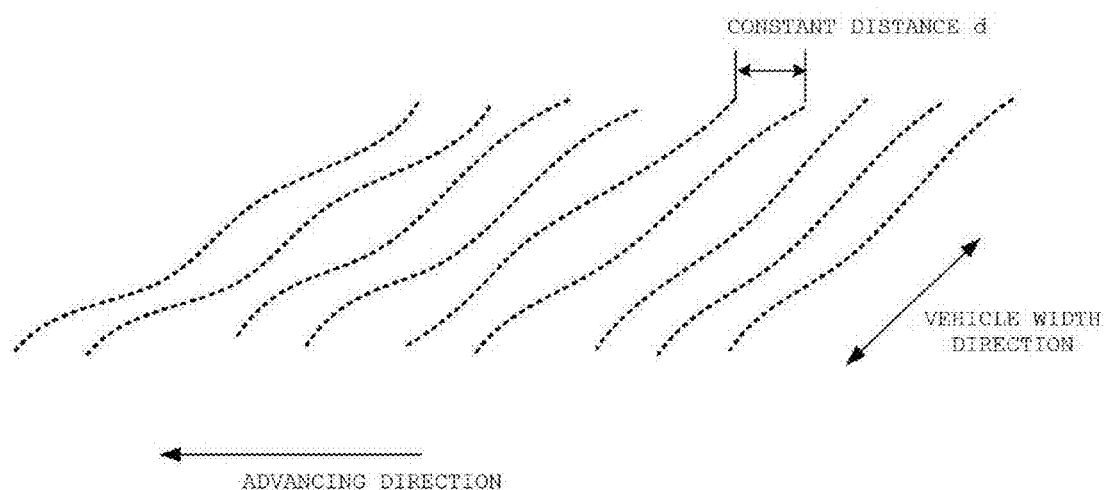
FIGS. 5A and 5B are a schematic view showing an outline of measurement data, where
Figure 5B:
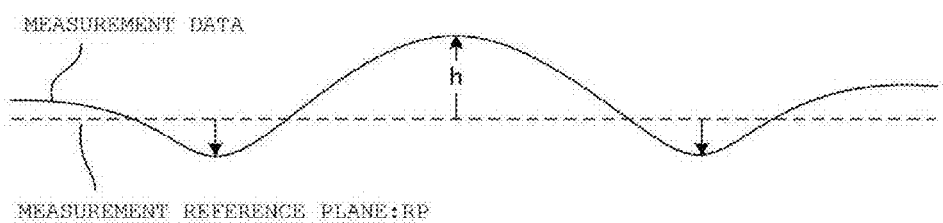

FIGS. 5A-B are a schematic view showing an outline of the measurement data, where FIG. 5A is a perspective view of the measurement data, and FIG. 5B is a schematic view showing the measurement data and a measurement reference plane. As shown in FIG. 5A, the data acquiring device 300 acquires the measurement data of each point on a plurality of trajectories of the scan light La respectively spaced apart by a constant distance "d" in the road 400. As shown in FIG. 5B, the measurement data represents a spaced amount "h" from a measurement reference plane (e.g., geoid plane) RP set by the data acquiring device 300.

Figure 2A:
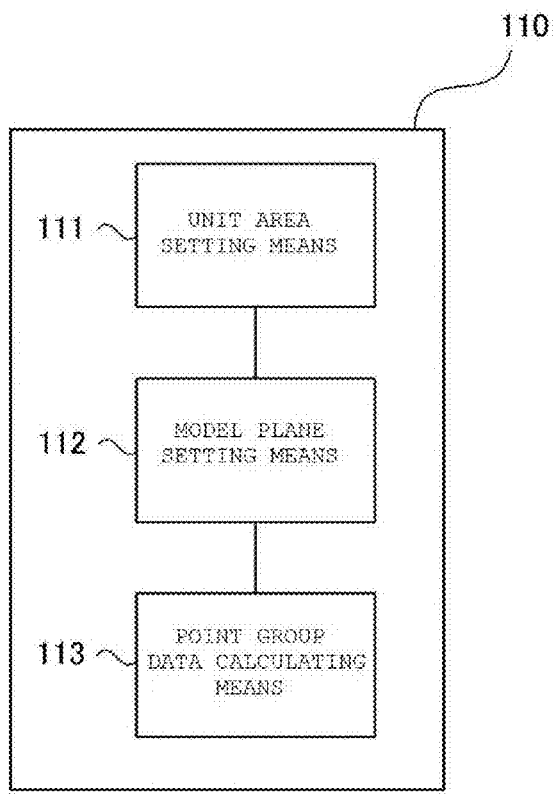
FIGS. 2A and 2B show a configuration of the display device, where
Figure 2B:
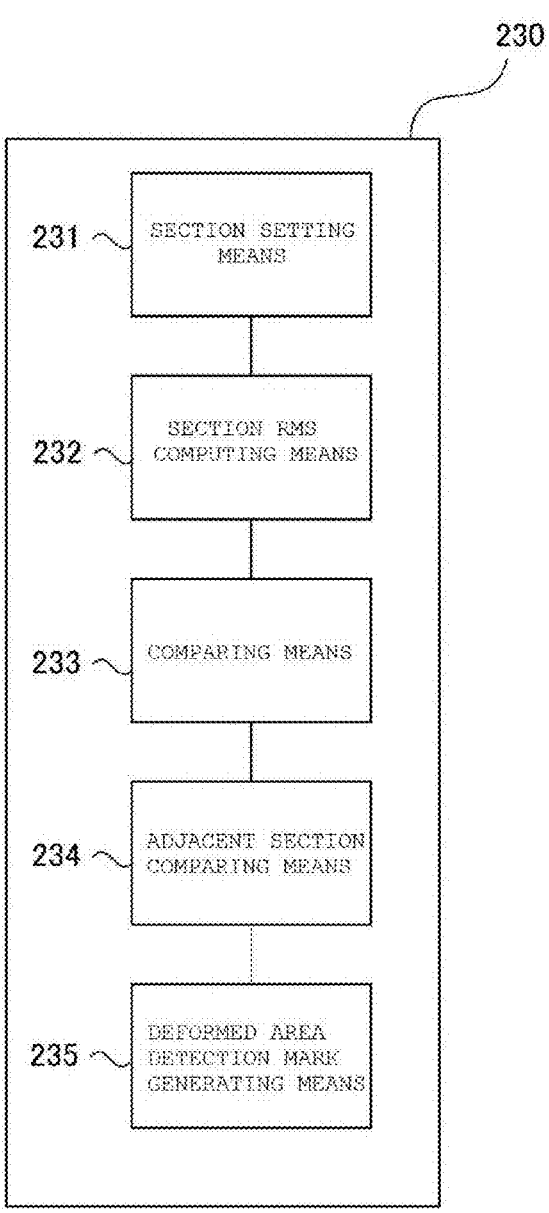

A detailed configuration of the display device 100 will now be described. First, a configuration of the point group data generating means 110 and the deformed area detecting means 230 of the display device 100 will be described. FIGS. 2A-B show a configuration of the display device, where FIG. 2A is a block diagram showing a configuration of the point group data generating means and FIG. 2B is a block diagram showing a configuration of the deformed area detecting means; and FIGS. 3A-B show an operation of the display device, where FIG. 3A is a flowchart showing a processing procedure of the point group data generating means and FIG. 3B is a flowchart showing a processing procedure of the deformed area detecting means.

As shown in FIG. 2A, the point group data generating means 110 includes a unit area setting means 111, a model plane setting means 112, and a point group data calculating means 113. The unit area setting means 111 acquires the measurement data from the data acquiring device 300 (step SA1 of FIG. 3A), and sets a unit area having a preset length dimension along the path in a width of a road along the relevant path.

Figure 6A:
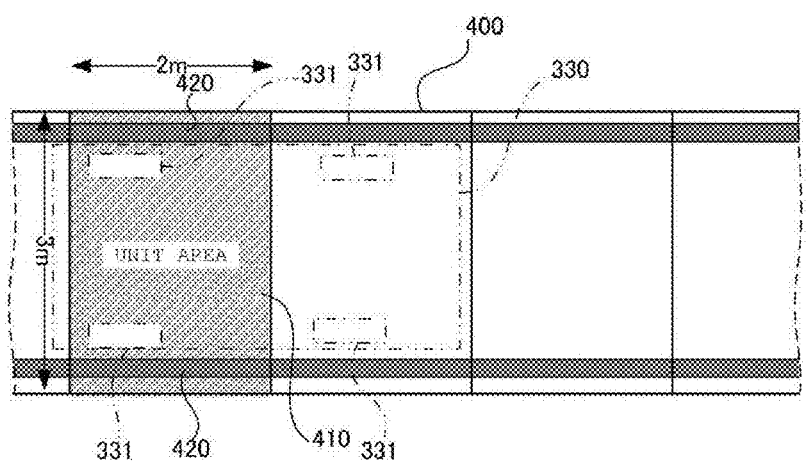
FIGS. 6A and 6B show an acquired state of the point group data in a unit area, where
Figure 6B:
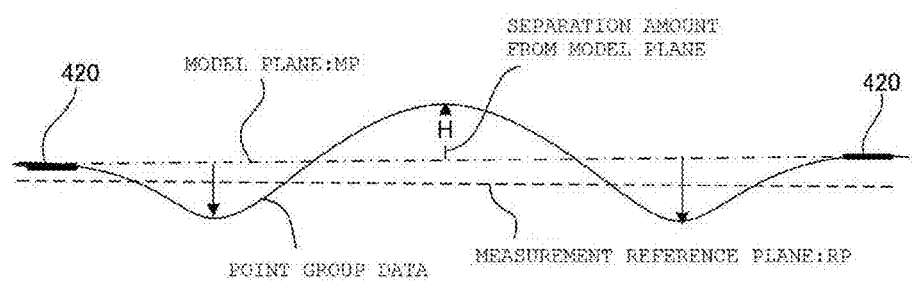

FIGS. 6A-B show an acquired state of the point group data in the unit area, where FIG. 6A is a schematic view showing the unit area and FIG. 6B is a schematic view showing the point group data and the model plane MP. The unit area setting means 111 divides the road 400 to be measured to, for example, a unit area 410 having a width of 3 m and a length of 2 m (step SA2 of FIG. 3A), as shown in FIG. 6A. A width dimension can be set with the width of one lane of the road, from one road shoulder to another shoulder, the width, and the like of the vehicle used for the measurement, and the like as a reference. The length dimension is not limited to 2 m and can be appropriately set, but the computation of the setting of the model plane MP, and the like become cumbersome, and the gap between the model plane MP and the road surface shape may become large if the length dimension is too long.

Figure 3A:
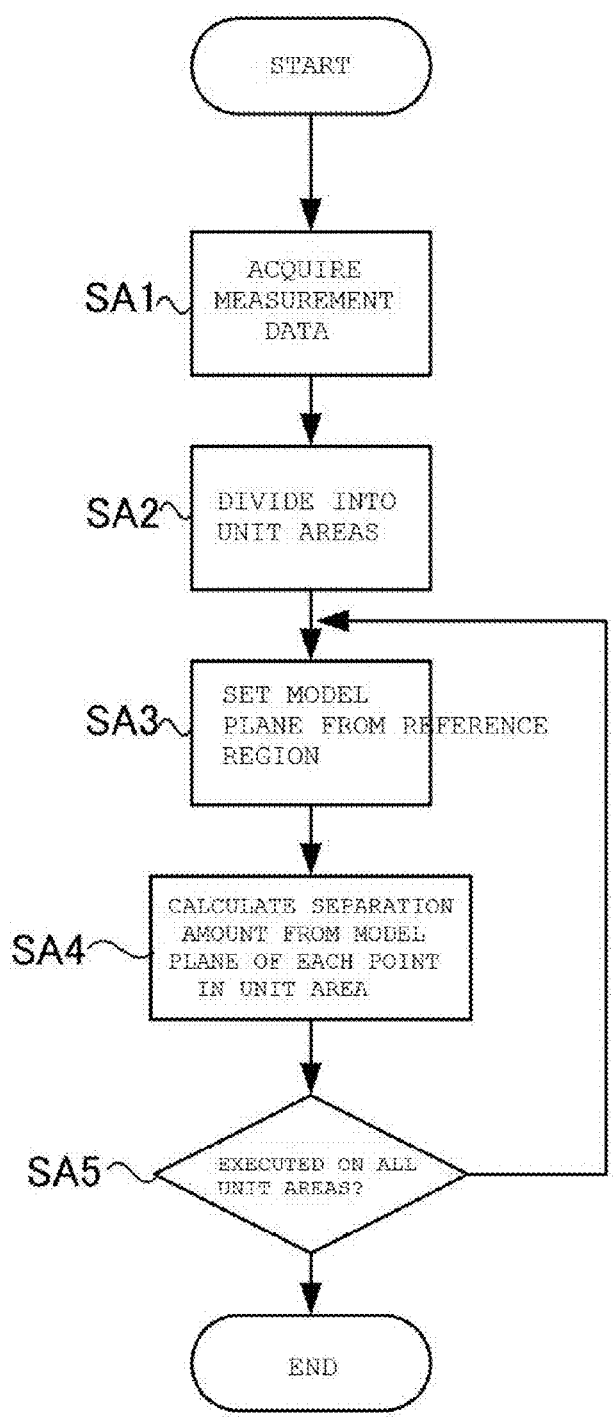
FIGS. 3A and 3B show an operation of the display device, where
Figure 3B:
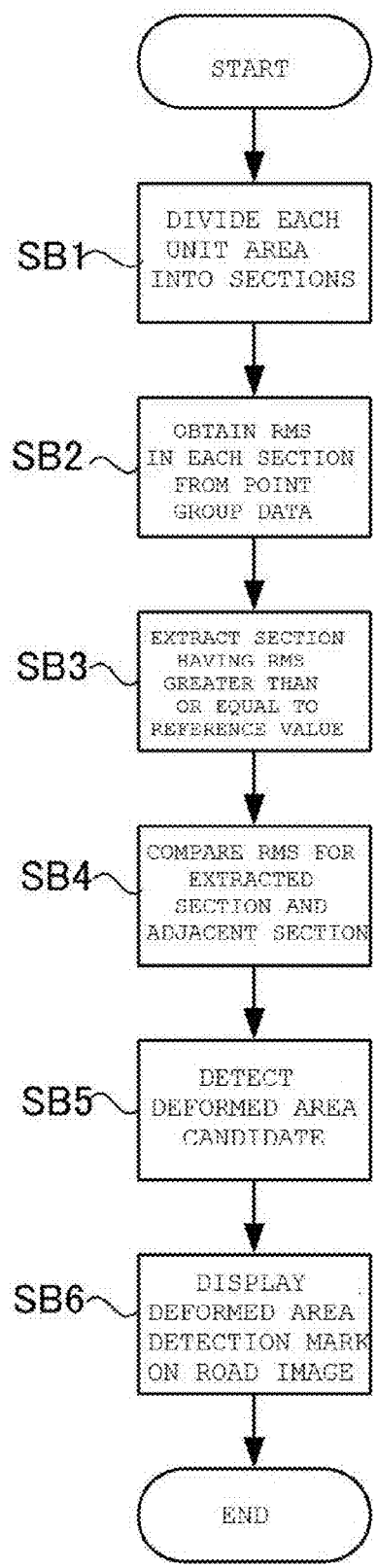

The model plane setting means 112 sets the model plane MP in the unit area 410 based on the measurement data, which is the spaced amount from the measurement reference plane, of each point at the measurement point in the unit area 410 (step SA3 of FIG. 3A). The model plane MP is set based on two regions spaced apart in the road width direction, for example, a reference region 420, which is a region having a width of 20 cm spaced apart by a predetermined distance (e.g., 20 cm) to the outer side from a wheel 331 of the vehicle 330, as shown in FIG. 6A. Specifically, the model plane MP can be obtained through a least square method from a great number of point groups belonging to the reference regions 420, 420. The reference region is not limited to two, and may be three or more such as three regions of a central region and regions on both end sides. In addition to the example above, the point group in a region having an interval dimension and a width dimension of a certain extent, and where damages and hollowing by the travelling of the vehicle are not anticipated, for example, the line end, the vicinity of the center of the vehicle width, and the paint of the lane mark can be used for the reference region. The lane mark can be acquired by measuring the luminance of the road surface at the time of the measurement of the road image by the data acquiring device 300.

As shown in FIG. 6B, the point group data calculating means 113 calculates the spaced amount "H" between the model plane MP and each point (step SA4 of FIG. 3A). This is executed for all the unit areas (step SA5 of FIG. 3A) to generate the point group data from the spaced amount of each point in the unit area 410. As shown in FIG. 6A, the point group data includes the spaced amount "H" from the model plane MP of each point on the unit area 410.

The point group data storage means 120 stores the point group data generated by the point group data generating means 110. A plurality of pieces of point group data generated by the point group data generating means 110 based on the measurement data acquired at different timing on the same road can be stored in the point group data storage means 120.

Figure 7A:
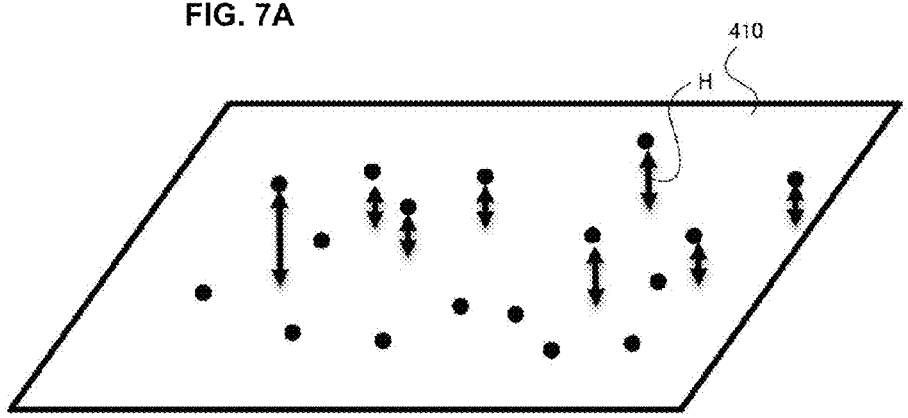
FIGS. 7A, 7B, and 7C show the spaced amount from the model plane and a state of display, where
Figure 7B:
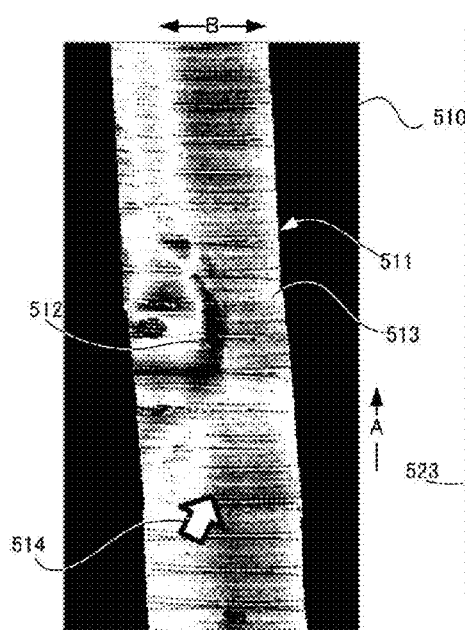
Figure 7C:
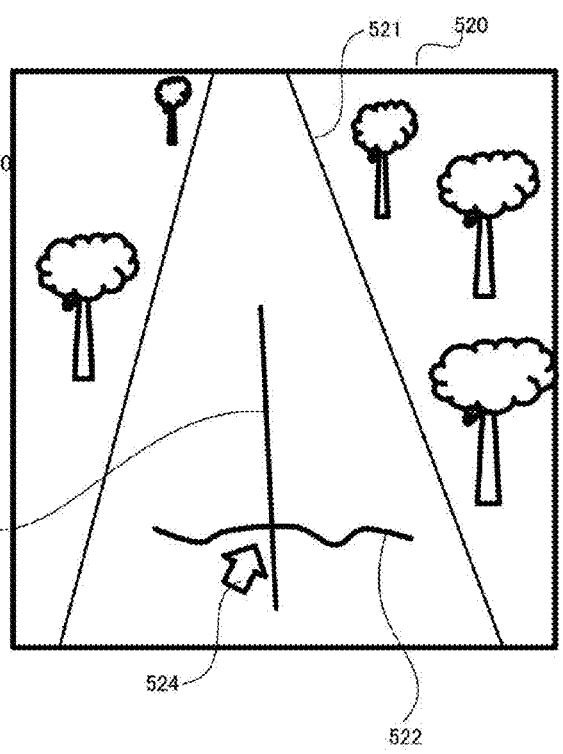

The spaced amount display data generating means 130 generates spaced amount display data for displaying the spaced amount image on the image displaying means 250 based on the region and the measurement date and time of the road specified from the input means 240. FIGS. 7A-C show the spaced amount from the model plane and a state of the display. A spaced amount image 510 is displayed on the image displaying means 250 based on the spaced amount display data. As shown in FIG. 7B, the spaced amount image, a region of the road is color coding gradation displayed based on the spaced amount of each point of the road. An arrow A in the figure indicates an advancing direction of a measuring vehicle, and an arrow B indicates a road width direction of the road.

The spaced amount image 510 shown in FIG. 6B is displayed as a grayscale image, where a highest area 512 than the model plane MP is displayed in white, a lowest area 513 than the model plane MP is displayed in black, and an area in between is displayed in gray shading in the road 511. The spaced amount from the model plane MP in the road thus can be easily recognized. Such image is actually an image in which the high and low state can be more easily recognized as a color gradation image.

The road image data storage means 140 stores road image data taken by the whole circumference camera 320 of the data acquiring device 300. The road image data acquired at different timing on the same road can be stored in the point group data storage means 120.

The road image data acquiring means 150 acquires the road image data to display based on the instruction from the input means 240. The acquired road image data is acquired at the same measurement date and time in the region of the road same as the spaced amount display data generated by the spaced amount display data generating means 130.

The road display image generating means 160 displays the road image 520 on the image displaying means 250 based on the road image data acquired by the road image data acquiring means 150. As shown in FIG. 7C, the road image 520 displays the image of the road 521 and the periphery thereof. In the present embodiment, the spaced amount image 510 and the road image 520 of the same date and time on the same road region are displayed in one display screen of the image displaying means 250. Furthermore, the spaced amount image 510 and the road image 520 have the same display region, and the change in image by the movement of the data acquiring device 300 is also linked.

As shown in FIGS. 7B and 7C, the pointer displaying means 170 displays a spaced amount image pointer 514 on the spaced amount image 510, and a road image pointer 524 on the road image 520. In the spaced amount image 510 and the road image 520, points specified by the spaced amount image pointer 514 and the road image pointer 524 cooperate to specify the same area on the road. One point on the spaced amount image 510 and the road image 520 can be specified with the spaced amount image pointer 514 and the road image pointer 524 by specifying and click operating a position with a mouse configuring the input means 240.

In the spaced amount image 510 or the road image 520, a horizontal profile, a vertical profile, and a numerical display, to be described later, at a point can be carried out by specifying the relevant point on the road with the spaced amount image pointer 514 or the road image pointer 524. A cursor having a cross line can be used for the pointer.

The transverse profile generating means 180 generates a transverse profile showing a cross-section in a road width direction of a road at an area specified with the spaced amount image pointer 514 or the road image pointer 524 in the spaced amount image 510 or the road image 520. The transverse profile is generated with reference to the point group data stored in the point group data storage means 120. In other words, the transverse profile can be generated by acquiring the spaced amount at the same path direction coordinate.

A transverse profile curve 531 is displayed in a transverse profile image display region 530 displayed on the image displaying means 250 based on the transverse profile (FIG. 8A). The shape of the transverse section of the road thus can be intuitively understood. As shown in FIG. 7C, a transverse profile curve 522 can be displayed in a superimposed manner on the relevant area of the road image 520.

The longitudinal profile generating means 190 generates a longitudinal profile showing a cross-section in the path direction of the road at the area specified with the spaced amount image pointer 514 or the road image pointer 524 in the spaced amount image 510 or the road image 520. The longitudinal profile is generated with reference to the point group data stored in the point group data storage means 120. In other words, the longitudinal profile can be generated by acquiring the spaced amount at the same road width direction coordinate. A longitudinal profile curve 541 is displayed in a longitudinal profile image display region 540 of the image displaying means 250 based on the longitudinal profile (FIG. 8B). As shown in FIG. 7C, a longitudinal profile curve 523 can be displayed in a superimposed manner on the relevant area of the road image 520.

The numerical data acquiring means 200 acquires the numerical information of the road at the area specified with the spaced amount image pointer 514 or the road image pointer 524 in the spaced amount image 510 or the road image 520 from the point group data. As shown in FIG. 8C, a coordinate of an area specified with the pointer, a spaced amount (separation amount), an acquired time, a transverse profile width dimension, and a longitudinal length dimension of the longitudinal profile are displayed as numerical values in a numerical display field 550 displayed in the image displaying means 250. The position of the transverse profile curve 531 and the longitudinal profile curve 541, the separation amount, the acquired time, the transverse width dimension of the transverse profile, and the longitudinal length dimension of the longitudinal profile are thereby displayed.

Figure 9:
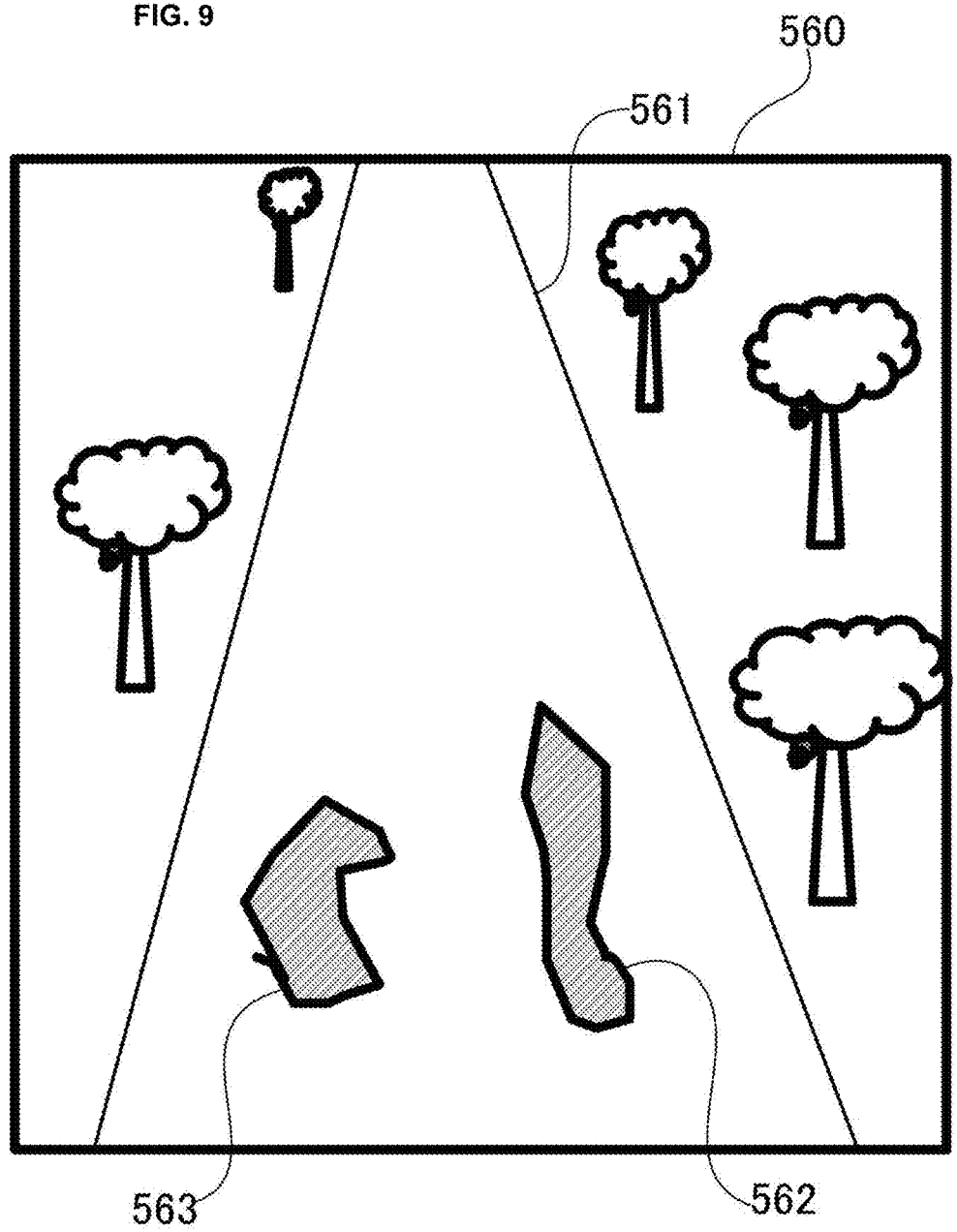
FIG. 9 is a schematic view showing a road image displaying a contour of a puddle displayed on the image displaying means.

The puddle display data generating means 210 generates a contour of an anticipated puddle with reference to the point group data based on the precipitation amount input from the input means 240. As shown in FIG. 9, contours 562, 563 are displayed in a superimposed manner on the road 561 of the road image 560. The state of the puddle corresponding to a predetermined amount of rainfall thus can be grasped.

In the display device 100, a plurality of longitudinal profiles at specified different timings on the same specified area can be displayed in a superimposed manner, and a plurality of transverse profiles at specified different timings on the same specified area can be displayed in a superimposed manner. This is carried out by specifying a plurality of timing on the area of the same road from the input means 240. The transverse profile generating means 180 and the longitudinal profile generating means 190 generate a plurality of profiles at different timing, and display the same on the image displaying means 250. The display state is shown in FIGS. 10A-C.

As shown in FIG. 10A, a past transverse profile curve 571 and a present transverse profile curve are displayed in a transverse profile display region 570, and a past longitudinal profile curve 581 and the present longitudinal profile curve 582 are displayed in a longitudinal profile display region 580. The change in profile on the same area thus can be grasped. In this case, the numerical data acquiring means 200 acquires the positions of the transverse profile curve and the longitudinal profile curve, the separation amount, the acquired time, the transverse width dimension of the transverse profile, and the longitudinal length dimension of the longitudinal profile, and such values can be displayed in a numerical display field 590 displayed on the image displaying means 250, as shown in FIG. 10B. Thus, the temporal change in the profile can be numerically grasped.

The temporal change acquiring means 220 can display the temporal change of the spaced amount from the model plane MP at the same area. This is generated by acquiring the temporal change in the spaced amount with reference to a plurality of pieces of point group data on the same area acquired at plural timing. The change in spaced amount thus can be displayed as a changing curve 601 in a temporal change display field 600 of the image displaying means 250 with a spaced amount (separation amount) on the vertical axis and the time on the horizontal axis, as shown in FIG. 10C. Thus, the temporal change of the road property at the specified point can be visually recognized, and can be further predicted. Furthermore, an area where the changing rate of the road surface property is large becomes an index of heavy traffic, and the like.

The deformed area detecting means 230 will now be described. As shown in FIG. 2B, the deformed area detecting means 230 includes a section setting means 231, an RMS computing means 232, a threshold value comparing means 233, an adjacent section comparing means 234, and a deformed area detection mark generating means 235. FIGS. 11A-B show a detection state and a display state of the deformed area, where FIG. 11A is a schematic view showing a section and FIG. 11B is a view showing a map image displaying the deformed area detection mark.

First, the section setting means 231 divides the unit area into sections (SB1 of FIG. 3B). As shown in FIG. 11A, the unit area 410 is marked to a grid form to be divided into regularly arranged sections 610, 610.

The section RMS computing means 232 calculates the RMS (Root Means Square) as the statistic of the point group data belonging to each section as a representative value of each section (step SB2 of FIG. 3B). The threshold value comparing means 233 compares the representative value of each section with a predefined reference value to extract a section greater than the reference value (step SB3 of FIG. 3B).

Next, the adjacent section comparing means 234 compares the extracted representative value of each section and the representative value of the adjacent section (step SB4 of FIG. 3B), and detects an area where an absolute value of the changing amount, which is the difference of the representative values, is greater than a predefined threshold value as a deformed area candidate (step S5 of FIG. 3B). The section having a changing amount of greater than or equal to a defined value is thereby recorded as the deformed area candidate. In this case, a recess candidate or a projection candidate is discriminated by the representative value and a sign of the difference of the representative values. Determination is made as a candidate of the deformed area even if the sections having a changing amount greater than the threshold value are adjacent to each other. The recess candidate includes a pot hole, and the like, and the projection candidate includes a protrusion, and the like formed between the splits.

The deformed area detection mark generating means 235 generates a deformed area detection mark corresponding to the contour of the section to become the deformed area candidate. A deformed area detection mark 622 is thus displayed at a periphery of a detection position of the pot hole 621 or the deformed area in the road image 620, to be described later, as shown in FIG. 11B. Other than indicating the periphery of the detection position, the deformed area detection mark may be in any shape as long as it points to the deformed area.

Figure 12:
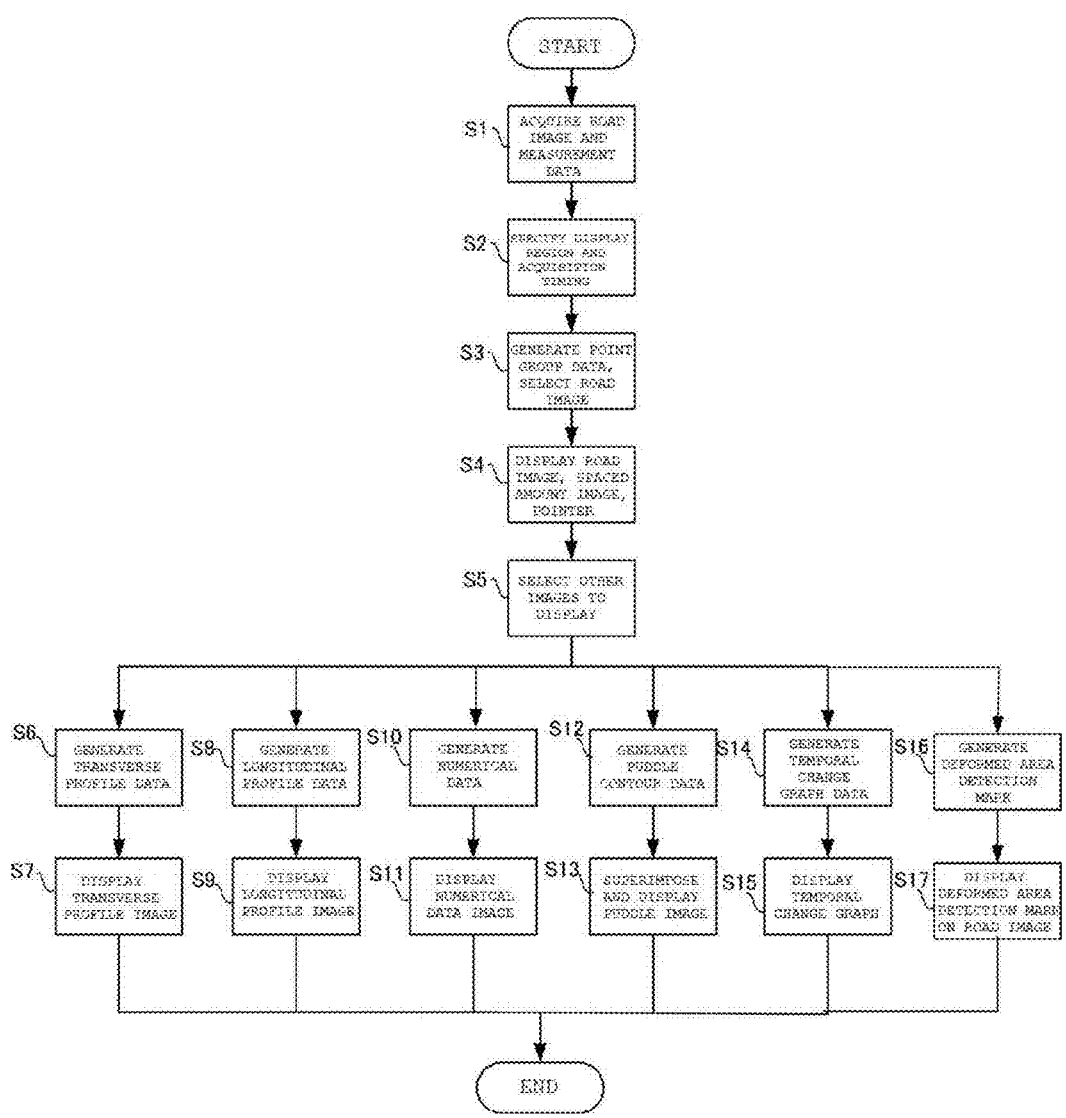
FIG. 12 is a flowchart showing a processing procedure of the display device of the road property according to the embodiment of the present invention.

The process of the display device 100 will be described below. FIG. 12 is a flowchart showing a processing procedure of the display device of the road property according to the embodiment of the present invention.

First, the display device 100 acquires the road image and the measurement data from the data acquiring device 300 (step S1). The road image is stored in the road image data storage means 140, and the measurement data is stored in the point group data generating means 110. Next, a display region (starting point, ending point) and an acquisition timing of the road to perform the display are specified from the input means 240 (step S2). Thus, 110 generates the point group data of the relevant region and timing, and stores the data in the point group data storage means 120, and the road image data acquiring means 150 acquires the road image data (step S3). Then, the spaced amount image 510 and the road image 520 are displayed, and the spaced amount image pointer 514 is displayed in the spaced amount image 510 and the road image pointer 524 is displayed in the road image 520 by the pointer displaying means 170 (step S4). The images shown in FIGS. 7B and 7C are thereby simultaneously displayed by the input means 240 as basic images.

An image to be additionally displayed is then selected from the input means 240, and the respective display processes are performed. In other words, when the display of the transverse profile is specified and the point to be displayed and the timing are set, the image data of the transverse profile is generated by the transverse profile generating means 180 (step S6), and the transverse profile image display region 530 shown in FIG. 8A is displayed in the image displaying means 250. When displaying the transverse profile display region 570 of different timing shown in FIG. 10A, two timing are specified from the input means 240.

Similarly, when the display of the longitudinal profile is specified and the point to be displayed and timing are set, the longitudinal profile image is generated by the longitudinal profile generating means 190 (step S8), and the longitudinal profile image display region 540 shown in FIG. 8B is displayed in the image displaying means 250 (step S9). When displaying the longitudinal profile display region 580 of different timing shown in FIG. 10B, two timing are specified from the input means 240.

Furthermore, when the display of the numerical data is specified and the point to be displayed and the timing are set, the numerical data is acquired by the numerical data acquiring means 200 and the display data is generated (step S10), and the numerical display field 550 shown in FIG. 8C is displayed on the image displaying means 250 (step S11).

Furthermore, when the puddle contour display is specified, and the point to be displayed, timing, and amount of rainfall are specified, the puddle contour data is generated by the puddle display data generating means 210 (step S12), and the contours 562, 563 of the puddle are displayed in a superimposed manner on the road image 560 in the image displaying means 250 (step S13), as shown in FIG. 9.

Similarly, when the temporal change image display is specified from the input means 240, and the specified point and display period are set, the temporal change graph data is generated by the temporal change acquiring means 220 (step S14), and the temporal change display field 600 shown in FIG. 10C is displayed on the image displaying means 250 (step S15).

When the deformed area hole detection display is specified from the input means 240, and the point to be displayed and the timing are set, the position of the pot hole, which is the deformed area, is detected to generate the detection mark by the deformed area detecting means 230 (step S16), and the deformed area detection mark 622 is displayed in a superimposed manner on the road image to display the road image 620 in the input means 240 (step S17), as shown in FIG. 11B.

The road image, the spaced amount image, and the map image described above can be displayed on the image displaying means 250 alone or two or more of such images may be selected. A desired image thus can be displayed, and the road property can be comprehensively and accurately determined.

Therefore, according to the display method of the road property and the display device of the road property of the embodiment of the present invention, efficient and effective screen display at the time of the road surface property evaluation can be carried out.

The invention claimed is:

1. A display method of a road property comprising the steps of:
    acquiring, using a data acquiring device, measurement data on a spaced amount from a measurement reference plane at each point of a road surface measured for a predetermined road width along a measurement path of a road to be measured;
    setting, using a display and a unit area setting means thereof, a unit area to become a unit of processing based on the measurement data;
    setting, using the display and a model plane setting means thereof, a model plane in the unit area from the measurement data in the unit area, and generating point group data indicating a spaced amount from the model plane at each point of the unit area;
    generating, using the display and a spaced amount display generating means thereof, spaced amount display data displaying shading or hue corresponding to a spaced amount specified with the point group data in a contour of the road; and
    determining at least one repair state of the road by simultaneously displaying, on the display, a road image of the road together with a spaced amount image based on the spaced amount display data corresponding to a specified area of the road, the spaced amount image showing an uneven state of the road surface.

2. The display method of the road property according to claim 1, further comprising the steps of:
    acquiring road image data including the road acquired along the measurement path; and
    displaying the road image based on the road image data corresponding to the specified area of the road with the spaced amount image or with the spaced amount image superimposed.

3. The display method of the road property according to claim 1, comprising the steps of:
    acquiring map data including the road to be measured; and
    displaying a map image based on the map data with at least one of the spaced amount image or the road image.

4. The display method of the road property according to claim 1, wherein
    a road image pointer that points to one point on the road image and a spaced amount image pointer that points to one point on the spaced amount image are displayed, at least one of the road image pointer or the spaced amount image pointer being position variable; and
    the road image pointer and the spaced amount image pointer point to a same area of the road.

5. The display method of the road property according to claim 1, further comprising a step of displaying at least one of a longitudinal profile or a transverse profile of the road in an area specified in the road image or the spaced amount image.

6. The display method of the road property according to claim 4, wherein a value of at least one of a position coordinate at one point on the road specified with the road image pointer or the spaced amount image pointer, a spaced amount from the model plane, and an acquisition timing of the measurement data is displayed in characters.

7. The display method of the road property according to claim 1, further comprising the steps of:
    acquiring the point group data of a same position acquired at different timing; and
    executing at least one of displaying a plurality of longitudinal profiles at specified different timing in a same specified area in a superimposed manner, and displaying a plurality of transverse profiles at specified different timing in a same specified area in a superimposed manner.

8. The display method of the road property according to claim 1, further comprising the steps of
    acquiring the point group data of the same position acquired at different timing; and
    displaying a temporal change in the spaced amount from the model plane at the same specified area in a graph.

9. The display method of the road property according to claim 1, further comprising the steps of:
    generating a contour of a puddle formed in a recess of a road surface by an amount of precipitation specified based on the point group data; and
    displaying the contour on the road image in a superimposed manner.

10. The display method of the road property according to claim 1, further comprising the steps of:
    dividing the unit area into a plurality of sections and calculating a statistic of the point group data in each section;
    extracting a section having a statistic satisfying a predefined reference value;
    detecting a deformed area candidate based on a changing amount of the statistic of the extracted section and a statistic of a section adjacent to the extracted section; and displaying a deformed area detection mark at a detection position of the detected deformed area candidate in the road image.

11. A display device of a road property comprising:
means for storing measurement data on a spaced amount from a measurement reference plane at each point of a road surface measured for a predetermined road width along a measurement path of a road to be measured;
means for setting a unit area to become a unit of processing based on the measurement data;
means for setting a model plane in the unit area from the measurement data in the unit area;
means for generating point group data indicating a spaced amount from the model plane at each point of the unit area;
means for generating spaced amount display data displaying shading or hue corresponding to a spaced amount specified with the point group data in a contour of the road; and
means for simultaneously displaying on the display, a road image of the road together with a spaced amount image based on the spaced amount display data corresponding to a specified area of the road, the spaced amount image showing an uneven state of the road surface, and determining at least one repair state of the road from the simultaneous displaying of the road image and the spaced amount image.

12. The display device of the road property according to claim 11, further comprising:
means for acquiring road image data including the road acquired along the measurement path; and
means for displaying the road image based on the road image data corresponding to the specified area of the road with the spaced amount image or with the spaced amount image superimposed.

13. The display device of the road property according to claim 11, further comprising:
means for acquiring map data including the road to be measured; and
means for displaying a map image based on the map data with at least one of the spaced amount image or the road image.

14. The display device of the road property according to claim 11, further comprising: a means that points to one point on the road image and a spaced amount image pointer that points to one point on the spaced amount image are displayed, at least one of the road image pointer or the spaced amount image pointer being position variable; and
the road image pointer and the spaced amount image pointer cooperatively operate to point to a same area in the road.

15. The display device of the road property according to claim 13, further comprising a means for displaying at least one of a longitudinal profile or a transverse profile of the road in an area specified in the road image or the spaced amount image.

16. The display device of the road property according to claim 13, further comprising a means for displaying a value of at least one of a position coordinate at one point on the road specified with the road image pointer or the spaced amount image pointer, a spaced amount from the model plane, and an acquisition timing of the measurement data in characters.

17. The display device of the road property according to claim 11, wherein the means for storing the point group data includes at least one of:
means for storing the point group data of a same position acquired at different timing; or
means for displaying a plurality of longitudinal profiles at specified different timing in a same specified area in a superimposed manner, and a means for displaying a plurality of transverse profiles at specified different timing in a same specified area in a superimposed manner.

18. The display device of the road property according to claim 11, wherein
the means for storing the point group data stores the point group data of the same position acquired at different timing; and
the device further includes a means for displaying a temporal change in the spaced amount from the model plane at the same specified area in a graph.

19. The display device of the road property according to claim 11, further comprising:
means for generating a contour of a puddle formed in a recess of a road surface by an amount of precipitation specified based on the point group data; and
means for displaying the contour on the road image in a superimposed manner.

20. The display device of the road property according to claim 11, further comprising:
means for dividing the unit area into a plurality of sections and calculating a statistic of the point group data in each section;
means for extracting a section having a statistic satisfying a predefined reference value, and detecting a deformed area candidate based on a changing amount of the statistic of the extracted section and a statistic of a section adjacent to the extracted section; and
means for displaying a deformed area detection mark at a detection position of the detected deformed area candidate in the road image.

* * * * *